United States Patent
Kestler et al.

(10) Patent No.: US 11,506,571 B2
(45) Date of Patent: Nov. 22, 2022

(54) SYSTEM AND METHOD FOR GATHERING FLIGHT LOAD DATA

(71) Applicant: Rohr, Inc., Chula Vista, CA (US)

(72) Inventors: Steven M. Kestler, San Diego, CA (US); Kevin W. Teets, Burlington, VT (US)

(73) Assignee: Rohr, Inc., Chula Vista, CA (US)

( * ) Notice: Subject to any disclaimer, the term of this patent is extended or adjusted under 35 U.S.C. 154(b) by 550 days.

(21) Appl. No.: 16/564,862

(22) Filed: Sep. 9, 2019

(65) Prior Publication Data

US 2021/0072118 A1   Mar. 11, 2021

(51) Int. Cl.
| | |
|---|---|
| *F01D 17/02* | (2006.01) |
| *F02K 1/72* | (2006.01) |
| *G01M 15/14* | (2006.01) |
| *B64F 5/60* | (2017.01) |
| *B64D 45/00* | (2006.01) |
| *G01H 1/00* | (2006.01) |
| *G01M 15/04* | (2006.01) |

(52) U.S. Cl.
CPC ............. *G01M 15/14* (2013.01); *B64D 45/00* (2013.01); *B64F 5/60* (2017.01); *F01D 17/02* (2013.01); *F02K 1/72* (2013.01); *G01H 1/006* (2013.01); *G01M 15/048* (2013.01)

(58) Field of Classification Search
CPC . B64D 45/00; B64F 5/60; F01D 17/02; F02K 1/70; F02K 1/64; F02K 1/76; G01H 1/006; G01M 15/14; G01M 15/048
See application file for complete search history.

(56) References Cited

U.S. PATENT DOCUMENTS

| | | |
|---|---|---|
| 3,815,357 A | 6/1974 | Brennan |
| 4,827,248 A | 5/1989 | Crudden |
| 6,094,908 A | 8/2000 | Baudu |
| 6,134,485 A | 10/2000 | Tanielian |
| 8,752,394 B2 | 6/2014 | Ernst |
| 8,798,817 B2 | 8/2014 | O'Dell |
| 9,303,590 B2 | 4/2016 | West |
| 10,035,609 B2 | 7/2018 | Ziarno |
| 10,119,521 B2 | 11/2018 | Thomsen |

(Continued)

FOREIGN PATENT DOCUMENTS

| | | |
|---|---|---|
| CA | 2160093 C | 7/2007 |
| CN | 106335633 A | 1/2017 |

(Continued)

OTHER PUBLICATIONS

EP search report for EP19212397.4 dated Jul. 3, 2020.

*Primary Examiner* — Andrew H Nguyen
*Assistant Examiner* — Henry Ng
(74) *Attorney, Agent, or Firm* — Getz Balich LLC

(57) ABSTRACT

A method for gathering flight load data for a gas turbine engine includes providing a plurality of blocker doors rotatably mounted to a translating sleeve and a plurality of blocker door islands, each blocker door island disposed between circumferentially adjacent blocker doors of the plurality of blocker doors and mounted to at least one mounting point of the translating sleeve, wherein a blocker door island of the plurality of blocker door islands is a data acquisition unit; and connecting the data acquisition unit to at least one sensor in communication with the translating sleeve.

20 Claims, 8 Drawing Sheets

(56) References Cited

U.S. PATENT DOCUMENTS

| | | | |
|---|---|---|---|
| 10,126,208 B2 * | 11/2018 | Bianchi | G01F 1/684 |
| 10,156,205 B2 | 12/2018 | Scanlon | |
| 10,352,824 B2 | 7/2019 | Long | |
| 11,002,222 B2 * | 5/2021 | Mickelsen | F01D 25/14 |
| 2005/0075769 A1 | 4/2005 | Eschborn | |
| 2009/0173823 A1 | 7/2009 | Shetzer | |
| 2010/0089030 A1 * | 4/2010 | Carmichael | F01D 21/14 |
| | | | 60/226.3 |
| 2012/0200460 A1 * | 8/2012 | Weed | G01S 1/022 |
| | | | 342/385 |
| 2016/0245232 A1 | 8/2016 | Mackay | |
| 2017/0138371 A1 * | 5/2017 | Lemarchand | F02K 1/70 |
| 2017/0342941 A1 * | 11/2017 | Mears | F02K 1/72 |
| 2018/0058372 A1 | 3/2018 | Christensen | |
| 2018/0066668 A1 | 3/2018 | Consiglio | |
| 2019/0118978 A1 | 4/2019 | Fanton | |
| 2020/0025139 A1 * | 1/2020 | Ridray | F02K 1/76 |
| 2021/0061493 A1 * | 3/2021 | Pattison | G01M 5/0091 |
| 2021/0285382 A1 * | 9/2021 | Gonidec | F02K 1/76 |

FOREIGN PATENT DOCUMENTS

| | | |
|---|---|---|
| CN | 104875885 B | 7/2017 |
| CN | 106840591 B | 4/2019 |
| CN | 109552666 A | 4/2019 |
| CN | 109597133 A | 4/2019 |
| CN | 208887905 U | 5/2019 |
| CN | 109883642 A | 6/2019 |
| EP | 2607676 A2 | 6/2013 |

\* cited by examiner

SYSTEM AND METHOD FOR GATHERING FLIGHT LOAD DATA

BACKGROUND

1. Technical Field

This disclosure relates generally to gas turbine engines, and more particularly to systems and methods for gathering gas turbine engine flight load data.

2. Background Information

In some cases, issues (e.g., component mechanical issues) with a gas turbine engine program may persist after the program goes to production. Those issues may be solved via testing or analysis of the affected components. However, in some cases, the issue cannot be solved without accurate in-flight load data. Without a flight test program, getting the load data can be difficult.

Traditional test flight programs may involve installation of test equipment such as large controllers or data acquisition systems which may require substantial changes to the architecture of the gas turbine engine. For example, installation of the test equipment may require the fabrication and installation of new mounting points and mounting hardware as well as complicated wiring assemblies between the test equipment and sensors disposed in the gas turbine engine. Further, the installed test equipment may substantially affect the aerodynamic qualities of the nacelle of the gas turbine engine. There is a need in the art, therefore, for improved systems and methods for gathering gas turbine engine flight load data addressing one or more of the above-noted concerns.

SUMMARY

According to an embodiment of the present disclosure, a method for gathering flight load data for a gas turbine engine is provided. The method includes providing a plurality of blocker doors, rotatably mounted to a translating sleeve, and a plurality of blocker door islands, each blocker door island disposed between circumferentially adjacent blocker doors of the plurality of blocker doors and mounted to at least one mounting point of the translating sleeve, wherein a blocker door island of the plurality of blocker door islands is a data acquisition unit; and connecting the data acquisition unit to at least one sensor in communication with the translating sleeve.

In the alternative or additionally thereto, in the foregoing embodiment, the step of providing the plurality of blocker doors, rotatably mounted to the translating sleeve, and the plurality of blocker door islands includes replacing a first blocker door island of the plurality of blocker door islands with the data acquisition unit and mounting the data acquisition unit to the at least one mounting point of the translating sleeve.

In the alternative or additionally thereto, in the foregoing embodiment, the gas turbine engine includes a nacelle comprising the translating sleeve and a nacelle portion axially adjacent the translating sleeve, the translating sleeve and the nacelle portion disposed about an axial centerline of the gas turbine engine.

In the alternative or additionally thereto, in the foregoing embodiment, the translating sleeve is configured to axially translate relative to the nacelle portion and the nacelle portion is axially fixed relative to the gas turbine engine.

In the alternative or additionally thereto, in the foregoing embodiment, the method further includes gathering flight load data from the at least one sensor with the data acquisition unit.

In the alternative or additionally thereto, in the foregoing embodiment, the method further includes storing the flight load data with the data acquisition unit.

In the alternative or additionally thereto, in the foregoing embodiment, the method further includes removing the data acquisition unit from the translating sleeve subsequent to storing the flight load data; and reading the flight load data stored in the data acquisition unit.

In the alternative or additionally thereto, in the foregoing embodiment, the at least one sensor includes one or more of a temperature sensor or a pressure sensor.

In the alternative or additionally thereto, in the foregoing embodiment, the data acquisition unit is in communication with the at least one sensor via a wire.

In the alternative or additionally thereto, in the foregoing embodiment, the data acquisition unit and the at least one sensor are configured to axially translate with the translating sleeve.

According to another embodiment of the present disclosure, a system for gathering gas turbine engine flight load data includes a thrust reverser including a translating sleeve and an inner barrel. A plurality of blocker doors are hingedly attached to the thrust reverser. Each blocker door island of a plurality of blocker door islands is disposed between circumferentially adjacent blocker doors of the plurality of blocker doors and mounted to at least one mounting point of the thrust reverser. At least one sensor is in communication with the thrust reverser. A blocker door island of the plurality of blocker door islands is a data acquisition unit and the data acquisition unit is connected to the at least one sensor.

In the alternative or additionally thereto, in the foregoing embodiment, the gas turbine engine includes a nacelle including the translating sleeve and a nacelle portion axially adjacent the translating sleeve, the translating sleeve and the nacelle portion disposed about an axial centerline of the gas turbine engine.

In the alternative or additionally thereto, in the foregoing embodiment, the translating sleeve is configured to axially translate relative to the nacelle portion and the nacelle portion is axially fixed relative to the gas turbine engine.

In the alternative or additionally thereto, in the foregoing embodiment, the at least one sensor includes one or more of a temperature sensor or a pressure sensor.

In the alternative or additionally thereto, in the foregoing embodiment, the data acquisition unit is in communication with the at least one sensor via a wire.

In the alternative or additionally thereto, in the foregoing embodiment, the data acquisition unit and the at least one sensor are configured to axially translate with the translating sleeve.

According to another embodiment of the present disclosure, a gas turbine engine includes an engine core having an axial centerline and a nacelle surrounding the engine core. The nacelle includes a thrust reverser and an axially fixed nacelle portion axially adjacent the thrust reverser. The thrust reverser includes a translating sleeve. A plurality of blocker doors are rotatably mounted to an interior surface of the translating sleeve. Each blocker door island of a plurality of blocker door islands is disposed between circumferentially adjacent blocker doors of the plurality of blocker doors and mounted to at least one mounting point of the translating sleeve. At least one sensor is in communication with the translating sleeve. A blocker door island of the plurality of blocker door islands is a data acquisition unit and the data acquisition unit is connected to the at least one sensor.

In the alternative or additionally thereto, in the foregoing embodiment, the data acquisition unit has outer radial side mounted to translating sleeve and an inner radial side opposite the outer radial side and wherein the inner radial side defines a portion of a bypass flowpath of the gas turbine engine.

In the alternative or additionally thereto, in the foregoing embodiment, the data acquisition unit and the at least one sensor are configured to axially translate with the translating sleeve.

In the alternative or additionally thereto, in the foregoing embodiment, the at least one sensor includes one or more of a temperature sensor or a pressure sensor.

The present disclosure, and all its aspects, embodiments and advantages associated therewith will become more readily apparent in view of the detailed description provided below, including the accompanying drawings.

DETAILED DESCRIPTION

Figure 1:
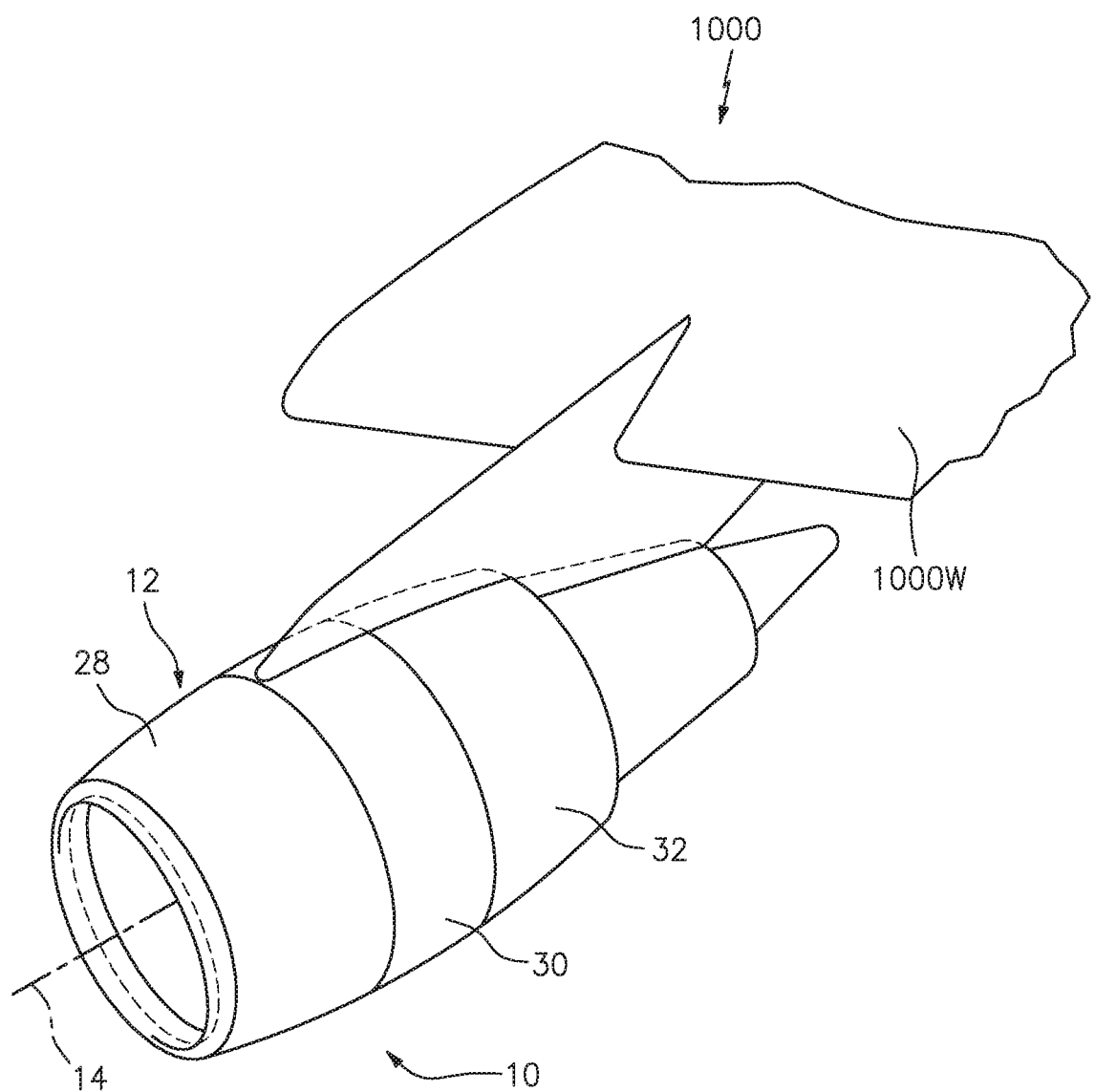
FIG. 1 illustrates a perspective view of an exemplary gas turbine engine in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
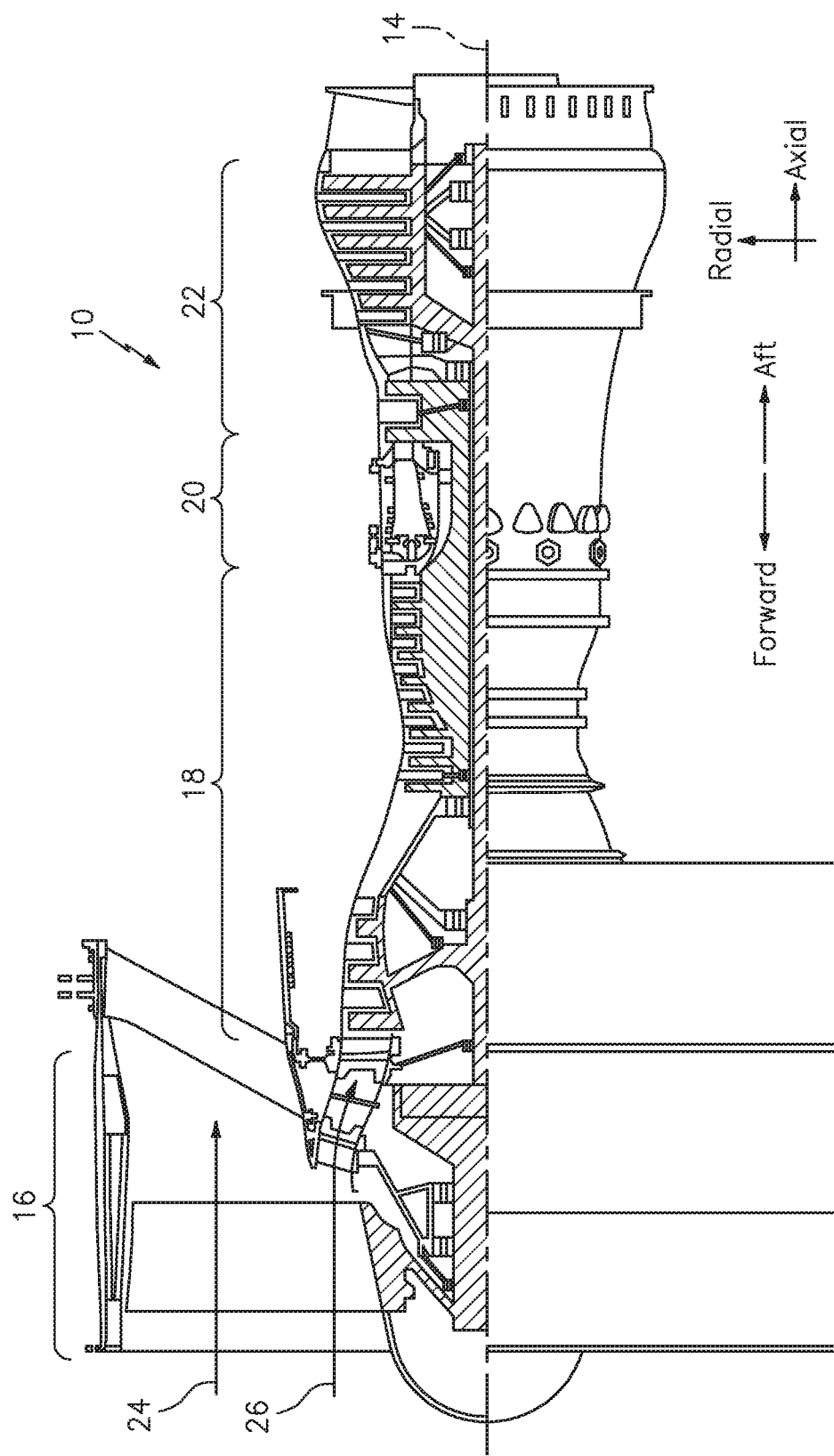
FIG. 2 illustrates a side cross-sectional view of an exemplary gas turbine engine in accordance with one or more embodiments of the present disclosure.

Referring to FIGS. 1 and 2, an exemplary gas turbine engine 10 is illustrated mounted to, for example, a wing 1000W of an aircraft 1000. The gas turbine engine 10 includes a nacelle 12 defining a housing of the gas turbine engine 10 about an axial centerline 14. The nacelle 12 supports and generally surrounds an engine core which generally includes a fan section 16, a compressor section 18, a combustor section 20, and a turbine section 22. The fan section 16 drives air along a bypass flowpath 24 while the compressor section 18 drives air along a core flowpath 26 for compression and communication into the combustor section 20 and then expansion through the turbine section 22.

The nacelle 12 may generally include an intake cowl 28 disposed forward of the fan section 16, a fan cowl 30 that circumferentially surrounds and shields the fan section 16, and a thrust reverser 32 that may circumferentially surround one or more of the compressor section 18, the combustor section 20, and the turbine section 22. At least a portion of the thrust reverser 32 may be configured to move (e.g., axially) relative to the intake cowl 28 and the fan cowl 30 of the nacelle 12.

Figure 3:
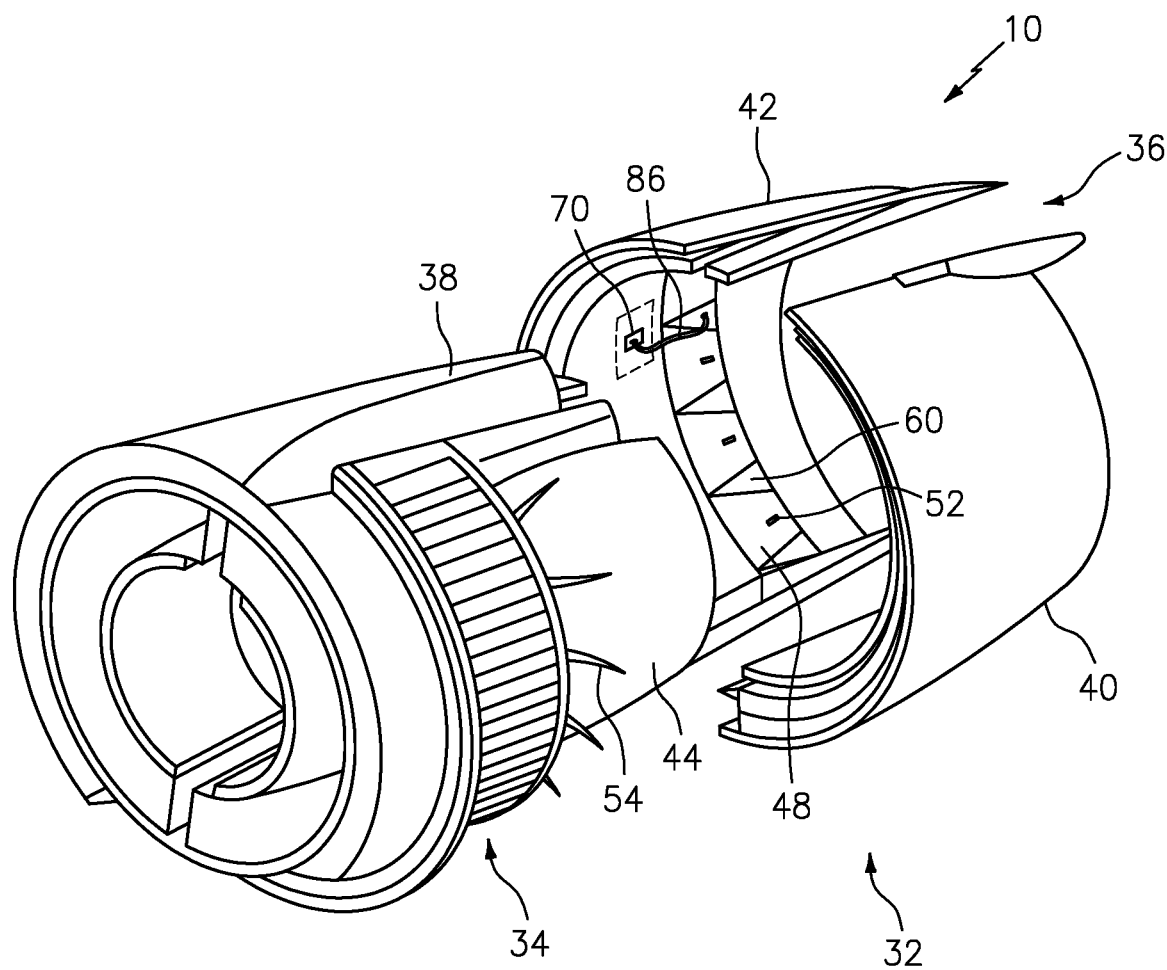
FIG. 3 illustrates an exploded perspective view of portions of an exemplary gas turbine engine in accordance with one or more embodiments of the present disclosure.

Referring to FIG. 3, the thrust reverser 32 may be, for example, a cascade-type thrust reverser. The thrust reverser 32 may include a plurality of cascade elements 34 and a translating sleeve 36 configured to mount to and axially translate along a track 38. The thrust reverser 32 may further include a portion of an inner barrel 44 of the nacelle 12. The translating sleeve 36 may be formed from one or more translating sleeve portions, for example, a first translating sleeve portion 40 and a second translating sleeve portion 42 as shown in FIG. 3. The translating sleeve portions 40, 42 may be generally semi-cylindrical in shape and may form an aft portion of the nacelle 12 configured to move relative to the remainder of the nacelle 12 by axially translating along the track 38. As with the other portions of the nacelle 12, the translating sleeve 36 may be radially spaced from the engine core of the gas turbine engine 10 thereby defining a portion of the bypass flowpath 24 between an interior surface 46 of the translating sleeve 36 and the engine core. The thrust reverser 32 may include one or more actuating units (not shown) configured to effect translation of the translating sleeve 36 by moving the translating sleeve 36 axially along the track 38.

The translating sleeve 36 of the thrust reverser 32 is configured to translate axially between a "deployed" position and a "stowed" position. With the translating sleeve 36 in the stowed position, the thrust reverser 32 is configured so as to not substantially impede bypass airflow transiting along the bypass flowpath 24. Accordingly, with the translating sleeve 36 in the stowed position, the bypass airflow may provide thrust for forward propulsion of the aircraft 1000. With the translating sleeve 36 in the deployed position, the thrust reverser 32 may be configured to block all or a substantial portion of the bypass airflow transiting along the bypass flowpath 24. Further, with the translating sleeve 36 in the deployed position, the thrust reverser 32 may be configured to redirect the bypass airflow transiting along the bypass flowpath 24 in a direction to counter forward propulsion of the aircraft 1000, such as through the plurality of cascade elements 34.

Figure 4:
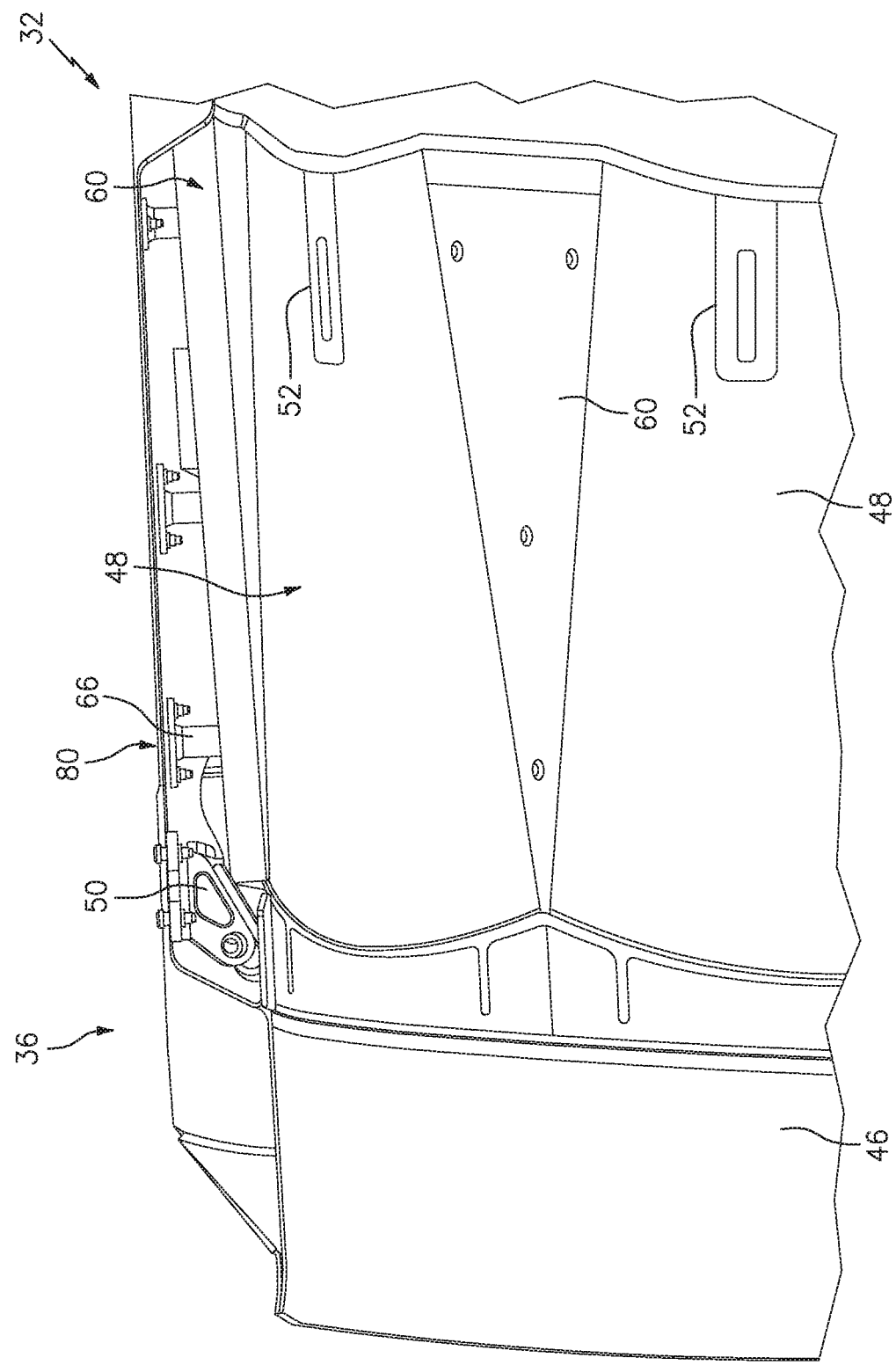
FIG. 4 illustrates an interior view of a portion of an exemplary thrust reverser translating sleeve in accordance with one or more embodiments of the present disclosure.
Figure 5:
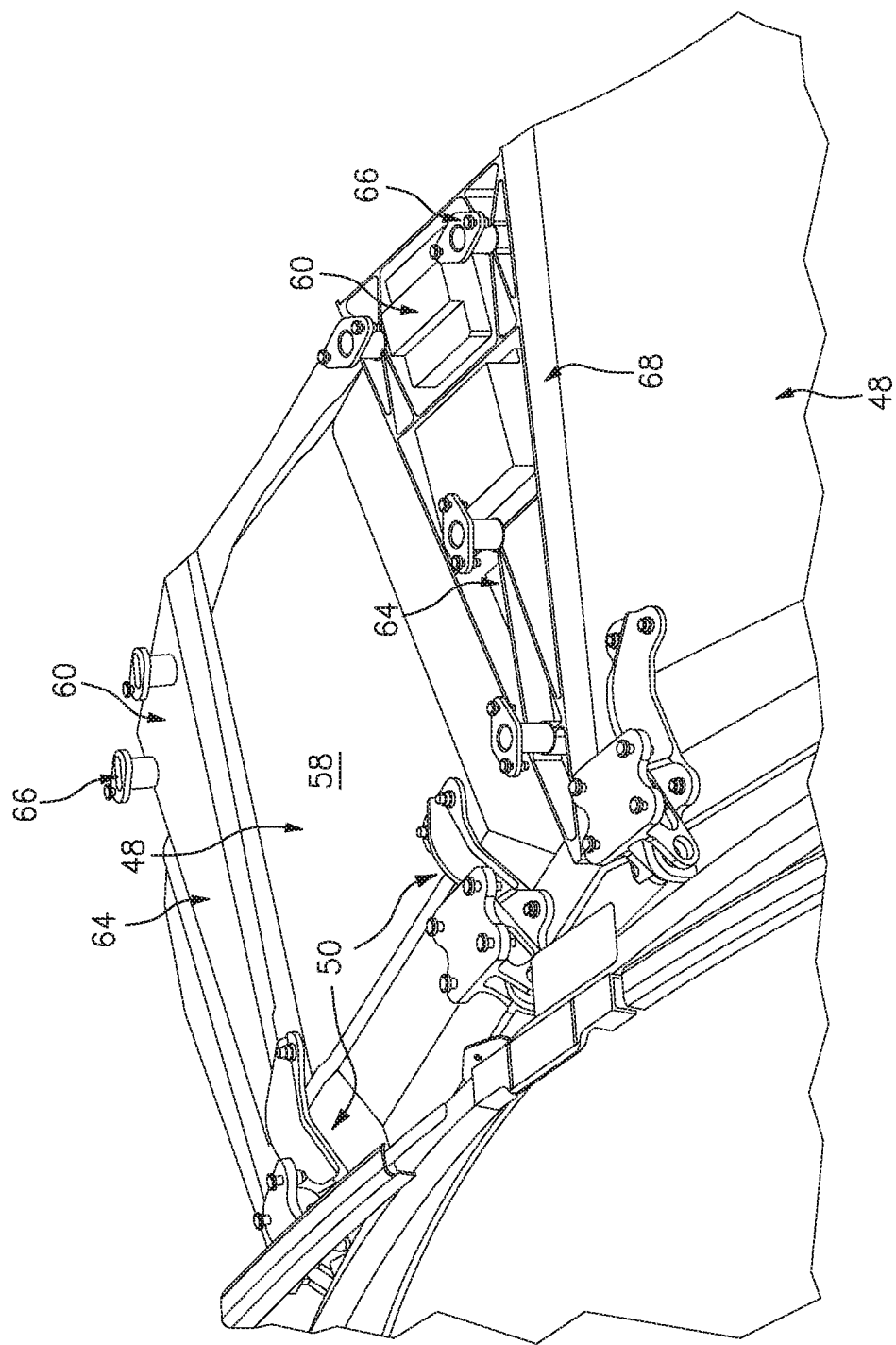
FIG. 5 illustrates an exterior view of a portion of the translating sleeve of FIG. 4 in accordance with one or more embodiments of the present disclosure.

Referring to FIGS. 3-5, the thrust reverser 32 may include a plurality of blocker doors 48 rotatably mounted to the translating sleeve 36 by, for example, one or more hinges 50 (e.g., the plurality of blocker doors 48 may be hingedly attached to the translating sleeve 36 by the one or more hinges 50). The plurality of blocker doors 48 may be disposed circumferentially about a radially inner portion of the translating sleeve 36. Each blocker door of the plurality of blocker doors 48 may be connected, at a connection point 52, to a respective blocker door link of a plurality of blocker door links 54. The plurality of blocker door links 54 may be mounted to and extend from a fixed portion of the nacelle 12 such as, for example, the inner barrel 44. Accordingly, as the translating sleeve 36 translates in a forward to aft direction from the stowed position to the deployed position, the plurality of blocker door links 54 may cause the respective plurality of blocker doors 48 to rotate in a first direction about the one or more hinges 50 such that the plurality of blocker doors 48 obstruct all or a substantial portion of the bypass flowpath 24 (e.g., a "deployed" position of the plurality of blocker doors 48). As the translating sleeve 36 translates in an aft to forward direction from the deployed position to the stowed position, the plurality of blocker door links 54 may cause the respective plurality of blocker doors 48 to rotate in a second direction, opposite the first direction, about the one or more hinges 50 such that the plurality of blocker doors 48 do not substantially obstruct the flow of bypass air along the bypass flowpath 24 (e.g., a "stowed" position of the plurality of blocker doors 48).

In various embodiments, the plurality of blocker doors 48 may include an inner radial side 56 which may form a portion of the interior surface 46 of the translating sleeve 36 when the translating sleeve 36 is in the stowed position. The plurality of blocker doors 48 may also include an outer radial side 58, opposite the inner radial side 56, which may be mounted to the translating sleeve 36 with the one or more hinges 50. In various other embodiments, the plurality of blocker doors 48 may alternatively be retained within the translating sleeve 36 (e.g., within an internal cavity or recess of the translating sleeve 36) when in the stowed position. Accordingly, the inner radial side 56 the plurality of blocker doors 48 may not form a portion of the interior surface 46 of the translating sleeve 36 when the translating sleeve 36 and the plurality of blocker doors 48 are in their respective stowed positions (e.g., the inner radial side 56 of the plurality of blocker doors 48 may be radially spaced from the interior surface 46 of the translating sleeve 36). In various other embodiments, the plurality of blocker doors 48 may alternatively be rotatably mounted to the inner barrel 44 by the one or more hinges 50 as opposed to being rotatably mounted to the translating sleeve 36. As such, the plurality of blocker doors 48 may be operated by the plurality of blocker door links 54 alternatively mounted, for example, to the translating sleeve 36 or by any other suitable mechanical means. Rotatably mounted to the inner barrel 44, the plurality of blocker doors 48 may form a portion of the exterior surface of the inner barrel 44 with the plurality of blocker doors 48 in the stowed position, thereby further defining the bypass flowpath 24 between the translating sleeve 36 and the inner barrel 44.

The thrust reverser 32 may additionally include a plurality of blocker door islands 60. Each blocker door island of the plurality of blocker door islands 60 may be disposed between each pair of circumferentially adjacent blocker doors of the plurality of blocker doors 48. In various embodiments, the plurality of blocker door islands 60 may be fixedly mounted to the translating sleeve 36 alternatingly between the plurality of blocker doors 48 in order to provide a substantially continuous interior surface 46 of the translating sleeve 32 in the stowed position so as to reduce or eliminate detrimental bypass airflow characteristics of the plurality of blocker doors 48. The plurality of blocker door islands 60 may include an inner radial side 62 which may form a portion of the interior surface 46 of the translating sleeve 36. With the plurality of blocker doors 48 in the stowed position, the inner radial sides 56, 62 plurality of blocker doors 48 and the plurality of blocker door islands 60 may form a substantially continuous surface defining a portion of the interior surface 46 of the translating sleeve 36. The plurality of blocker door islands 60 may also include an outer radial side 64, opposite the inner radial side 62, which may be mounted to the translating sleeve 36 with one or more support brackets 66. The translating sleeve 36 may include one or more mounting points 80, such as one or more fastener holes, through which the one or more support brackets 66 may be mounted to the translating sleeve 36, for example, by one or more fasteners. In various other embodiments, for example, where the plurality of blocker doors 48 is rotatably mounted to the inner barrel 44, the plurality of blocker door islands 60 may be fixedly mounted to the inner barrel 44. The plurality of blocker door islands 60 in this configuration may be alternatingly disposed between the plurality of blocker doors 48 in order to form a portion of a substantially continuous exterior surface of the inner barrel 44.

At least one blocker door island of the plurality of blocker door islands 60 may be a data acquisition unit 68 in communication with at least one sensor 70 in communication with the translating sleeve 36. The data acquisition unit 68 may be configured to gather flight load data during operation of the gas turbine engine 10. The data acquisition unit 68 may have a size, shape, and mounting configuration that is substantially identical to the other blocker door islands of the plurality of blocker door islands 60 such that a previously-installed, "conventional" (i.e., a non-data acquisition unit 68 blocker door island) can be replaced with the data acquisition unit 68 to incorporate monitoring of flight loads with minimal effect on the structural and/or aerodynamic capabilities of the nacelle 12.

Figure 6A:
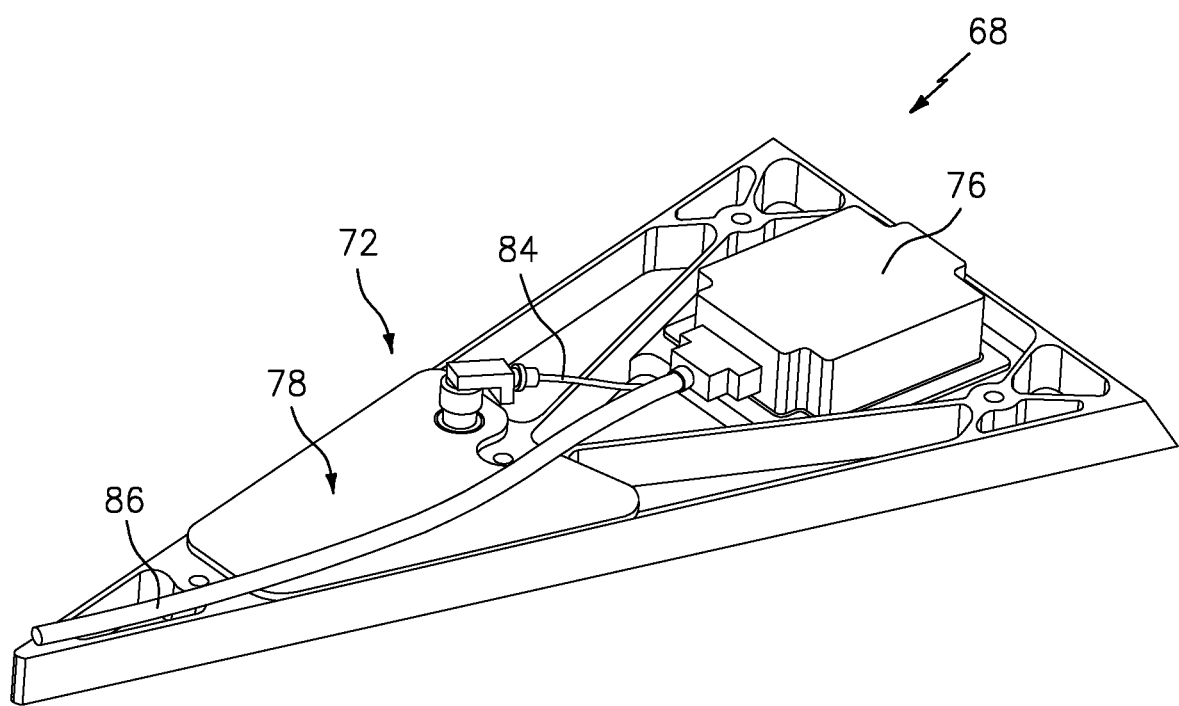
FIG. 6A-B illustrate perspective views of an exemplary data acquisition unit in accordance with one or more embodiments of the present disclosure.
Figure 6B:
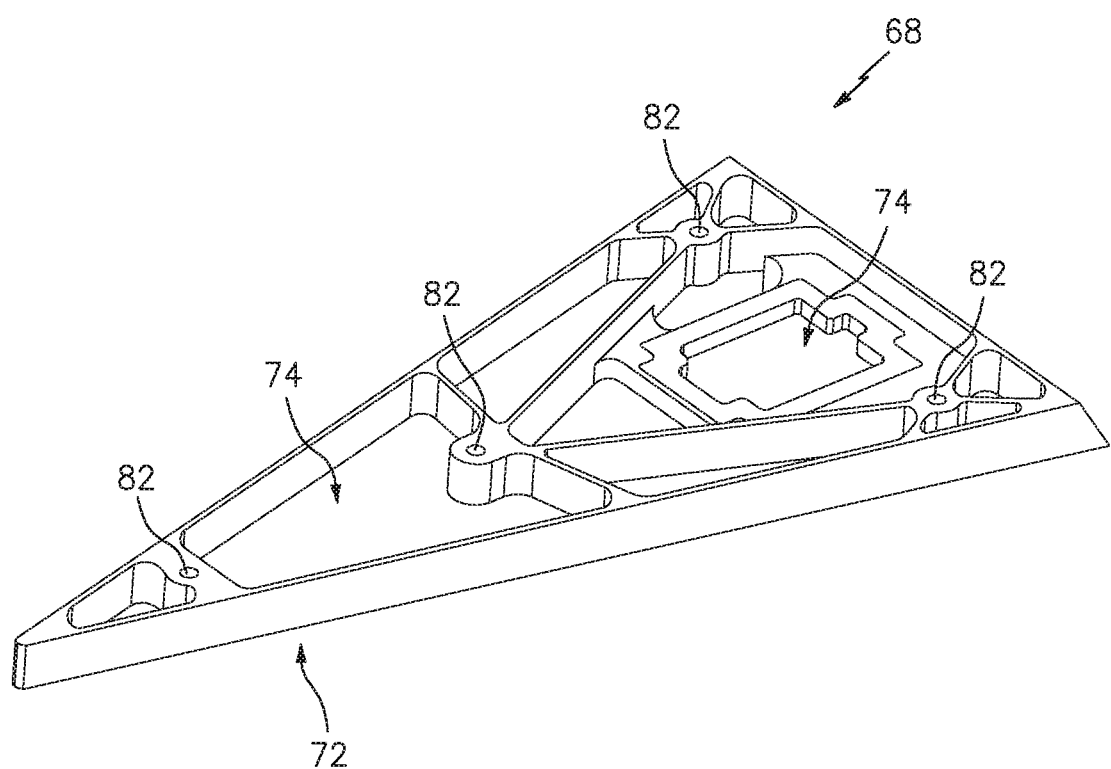

Referring to FIGS. 6A and 6B, the data acquisition unit 68 may include a data acquisition unit frame 72 which may have a size and shape which is substantially identical to the conventional blocker door islands of the plurality of blocker door islands 60. In various embodiments, the data acquisition unit frame 72 may be made from a same material as the conventional blocker door islands of the plurality of blocker door islands 60. In various other embodiments, the data acquisition unit frame 72 may be made from a different material than the conventional blocker door islands of the plurality of blocker door islands 60. The data acquisition unit frame 72 may include one or more recesses 74 within which electronic components of the data acquisition unit 68 may be disposed. The data acquisition unit frame 72 may include one or more attachment apertures 82 configured to receive and retain the one or more support brackets 66 for mounting the data acquisition unit 68 to the translating sleeve 36 (e.g., by threaded engagement between the one or more attachment apertures 82 and the one or more support brackets 66).

The data acquisition unit 68 may include an edge computing node (ECN) unit 76 disposed in one of the recesses 74. The ECN unit 76 may be in communication (e.g., signal communication) with the at least one sensor 70. The ECN unit 76 may include any type of computing device, computational circuit, or any type of process or processing circuit capable of executing a series of instructions that are stored in memory, for example, in a memory device of the ECN unit 76. The ECN unit 76 may include multiple processors and/or multicore CPUs and may include any type of processor, such as a microprocessor, digital signal processor, co-processors, a micro-controller, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the data acquisition unit 68 and the stored instructions are not limited to any particular form (e.g., program files, system data, buffers, drivers, utilities, system programs, etc.) provided they can be executed by the ECN unit 76 processor. The memory device of the ECN unit 76 may be a non-transitory computer readable storage medium configured to store instructions that when executed by one or more processors, cause the one or more processors to perform or cause the performance of certain functions. The memory device may be a single memory device or a plurality of memory devices. The memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the ECN unit 72 may be achieved via the use of hardware, software, firmware, or any combination thereof. The ECN unit 72 may additionally be in signal communication with one or more input devices (e.g., a keyboard, a touch screen, etc.) and output devices (a monitor, sensor readouts, data ports, etc.) that enable an operator to input instructions, receive data, etc.

In various embodiments, the data acquisition unit 68 may include a battery 78 disposed in one of the recesses 74. The battery 78 may provide power to electronic components of the data acquisition unit 68 such as, for example, the ECN unit 76 such that the data acquisition unit 68 does not require a connection to an alternative power source outside the data acquisition unit 68. The battery 78 may provide power to the ECN unit 76 by, for example, a cable 84. The data acquisition unit frame 72 of the data acquisition unit 68 may include one or more attachment bosses 82 configured to receive and retain the one or more respective support brackets 66 for mounting the data acquisition unit 68 to the translating sleeve 36.

In various embodiments, the data acquisition unit 68 may be configured to store the flight load data from the at least one sensor 70 in memory for subsequent analysis. In various embodiments, the data acquisition unit 68 may alternatively or additionally transmit the flight load data from the at least one sensor 70 to one or more external devices (e.g., devices outside the data acquisition unit 68) for storage in memory and/or real-time analysis of the flight load data. The data acquisition unit 68 may be in wired or wireless communication with the at least one sensor 70 and the one or more external devices. As shown in FIGS. 3 and 6A, the ECN unit 76 of the data acquisition unit 68 is in communication with the at least one sensor 70 via a wire 86.

The at least one sensor 70 may include one or more sensors configured to measure various parameters including for example, but not limited to, pressure, temperature, acceleration, vibration, altitude, and/or attitude. In various embodiments, the at least one sensor 70 may be mounted to the translating sleeve 36 at any suitable position for gathering flight load data. For example, the at least one sensor 70 may be mounted to the interior surface 46 of the translating sleeve 36.

As discussed above, the data acquisition unit 68 according to the present disclosure may use existing blocker door island mounting points 80 for attachment to the translating sleeve 36 allowing the data acquisition unit 68 to be installed and removed from the translating sleeve 36 during brief flight tests. Disposition of the data acquisition unit 68 and the at least one sensor 70 in the translating sleeve 36 may simplify installation as the data acquisition unit 68 and the at least one sensor 70 may translate axially together with the translating sleeve 36 (e.g., the data acquisition unit 68 and the at least one sensor 70 may be fixed relative to one another regardless of the translating sleeve 36 position), thereby simplifying wiring requirements between the data acquisition unit 68 and the at least one sensor 70. In various embodiments, both the data acquisition unit 68 and the at least one sensor 70 may be mounted to the inner barrel 44.

Figure 7:
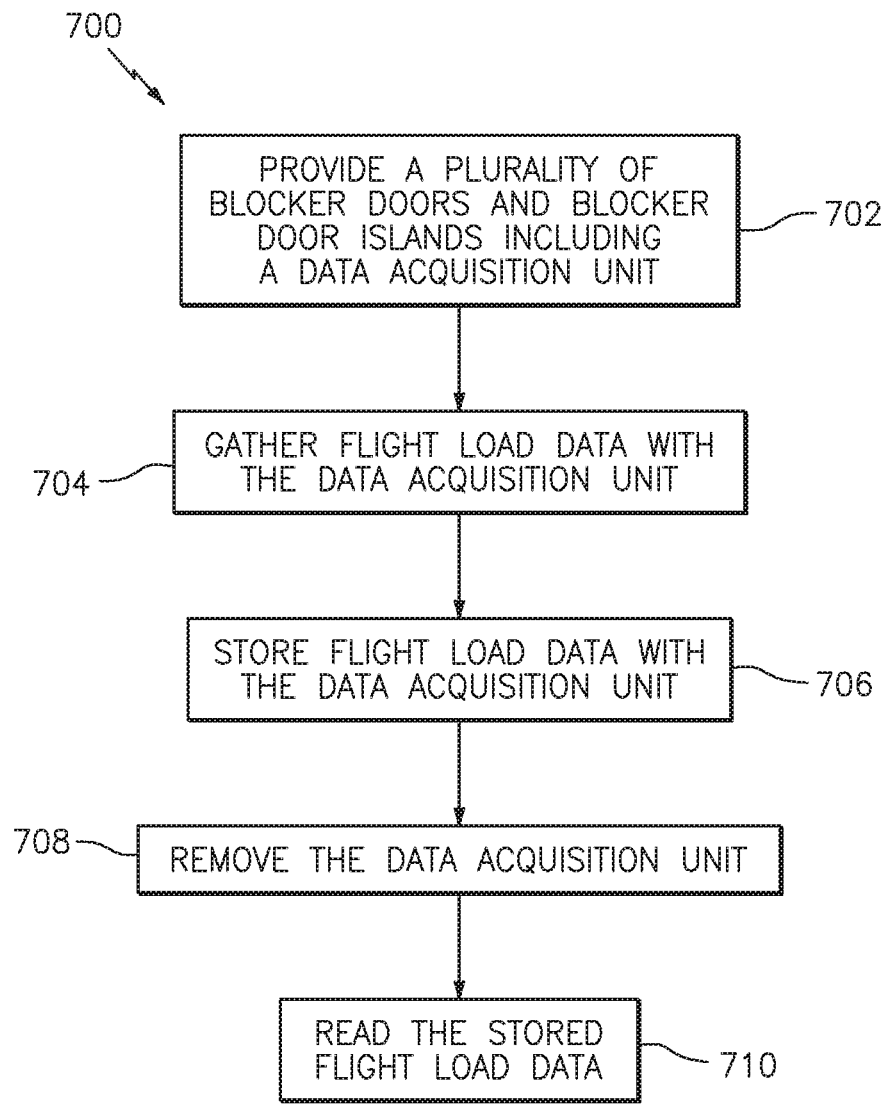
FIG. 7 illustrates a flow chart for a method for gathering flight load data for a gas turbine engine in accordance with one or more embodiments of the present disclosure.

Referring to FIG. 7, a method 700 for gathering flight load data for a gas turbine engine, such as the gas turbine engine 10, is provided. In Block 702, the plurality of blocker doors 48 rotatably mounted to the translating sleeve 36 and a plurality of blocker door islands 60 are provided. Each blocker door island of the plurality of blocker door islands 60 is disposed between circumferentially adjacent blocker doors of the plurality of blocker doors 48 and mounted to the at least one mounting point 80 of the translating sleeve 36. At least one blocker door island of the plurality of blocker door islands 60 is the data acquisition unit 68. Block 702 may further include replacing at least one blocker door island (e.g., a "conventional" blocker door island) of the plurality of blocker door islands 60 with the data acquisition unit 68 and mounting the data acquisition unit 68 to the at least one mounting point 80 of the translating sleeve 36. Accordingly, the data acquisition unit 68 may be mounted to the translating sleeve 36 at the existing one or more mounting points 80 to which the replaced at least one blocker door island of the plurality of blocker door islands 60 was previously mounted.

In Block 704, flight load data from the at least one sensor is gathered. For example, the ECN unit 76 of the data acquisition unit 68 may receive the flight load data from the at least one sensor 70.

In Block 706, the flight load data received from the at least one sensor 70 is stored with the data acquisition unit 68. For example, in various embodiments, the ECN unit 76 of the data acquisition unit 68 may store the flight load data in memory and/or may transmit the flight load data to one or more external devices for storage.

In Block 708, following the flight test and/or storage of the flight load data by the data acquisition unit 68, the data acquisition unit 68 may be removed from the translating sleeve 36. In Block 710, the flight load data stored by the data acquisition unit 68 may be read. It should be noted, however, that the data acquisition unit 68 need not be removed from the translating sleeve 36 prior to reading the flight load data from the data acquisition unit 68.

While the data acquisition unit 68 is described with respect to the plurality of blocker door islands 60, it should be understood that the present disclosure not limited to the use of a blocker door island as the data acquisition unit 68. For example, the data acquisition unit 68 may have a suitable size, shape, and mounting configuration such that the data acquisition unit 68 can be substituted for one or more other components of the gas turbine engine 10.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for gathering flight load data for a gas turbine engine, the method comprising:
    providing a plurality of blocker doors, rotatably mounted to a translating sleeve and providing a plurality of blocker door islands, each blocker door island disposed between circumferentially adjacent blocker doors of the plurality of blocker doors and mounted to at least one mounting point of the translating sleeve, wherein a blocker door island of the plurality of blocker door islands is a data acquisition unit, the data acquisition unit selectively mounted to a respective mounting point of the at least one mounting point; and
    connecting the data acquisition unit to at least one sensor mounted to an interior surface of the translating sleeve, the interior surface forming at least a portion of a bypass flow path of the gas turbine engine.

2. The method of claim 1, wherein the step of providing the plurality of blocker door islands includes removing a first blocker door island of the plurality of blocker door islands from the respective mounting point of the at least one mounting point and selectively mounting the data acquisition unit to the respective mounting point of the at least one mounting point.

3. The method of claim 2, further comprising gathering flight load data from the at least one sensor with the data acquisition unit.

4. The method of claim 3, further comprising storing the flight load data with the data acquisition unit.

5. The method of claim 4, further comprising:
    removing the data acquisition unit from the translating sleeve subsequent to storing the flight load data; and
    reading the flight load data stored in the data acquisition unit.

6. The method of claim 1, wherein the gas turbine engine includes a nacelle comprising the translating sleeve and a nacelle portion axially adjacent the translating sleeve, the translating sleeve and the nacelle portion disposed about an axial centerline of the gas turbine engine.

7. The method of claim 6, wherein the translating sleeve is configured to axially translate relative to the nacelle portion and the nacelle portion is axially fixed relative to the gas turbine engine.

8. The method of claim 7, wherein the data acquisition unit is in communication with the at least one sensor via a wire.

9. The method of claim 8, wherein the data acquisition unit and the at least one sensor are configured to axially translate with the translating sleeve.

10. The method of claim 1, wherein the at least one sensor includes one or more of a temperature sensor or a pressure sensor.

11. A system for gathering flight load data of a gas turbine engine, the system comprising:
    a thrust reverser comprising a translating sleeve and an inner barrel, the thrust reverser including an interior surface forming at least a portion of a bypass flow path of the gas turbine engine;
    a plurality of blocker doors hingedly attached to the thrust reverser;
    a plurality of blocker door islands, each blocker door island disposed between circumferentially adjacent blocker doors of the plurality of blocker doors and mounted to at least one mounting point of the thrust reverser; and
    at least one sensor mounted to the interior surface of the translating sleeve;
    wherein a blocker door island of the plurality of blocker door islands is a data acquisition unit and the data acquisition unit is connected to the at least one sensor, the data acquisition unit selectively mounted to a respective mounting point of the at least one mounting point.

12. The system of claim 11, wherein the gas turbine engine includes a nacelle comprising the translating sleeve and a nacelle portion axially adjacent the translating sleeve, the translating sleeve and the nacelle portion disposed about an axial centerline of the gas turbine engine.

13. The system of claim 12, wherein the translating sleeve is configured to axially translate relative to the nacelle portion and the nacelle portion is axially fixed relative to the gas turbine engine.

14. The system of claim 11, wherein the at least one sensor includes one or more of a temperature sensor or a pressure sensor.

15. The system of claim 11, wherein the data acquisition unit is in communication with the at least one sensor via a wire.

16. The system of claim 15, wherein the data acquisition unit and the at least one sensor are configured to axially translate with the translating sleeve.

17. A gas turbine engine comprising:
    an engine core having an axial centerline; and
    a nacelle surrounding the engine core, the nacelle comprising a thrust reverser and an axially fixed nacelle portion axially adjacent the thrust reverser, the thrust reverser comprising:
        a translating sleeve, the translating sleeve including an interior surface forming at least a portion of a bypass flow path with the bypass flow path between the engine core and the nacelle;
        a plurality of blocker doors rotatably mounted to an interior surface of the translating sleeve;
        a plurality of blocker door islands, each blocker door island disposed between circumferentially adjacent blocker doors of the plurality of blocker doors and mounted to at least one mounting point of the translating sleeve; and
        at least one sensor mounted to the interior surface of the translating sleeve;
        wherein a blocker door island of the plurality of blocker door islands is a data acquisition unit and the data acquisition unit is connected to the at least one sensor, the data acquisition unit selectively mounted to a respective mounting point of the at least one mounting point.

18. The gas turbine engine of claim 17, wherein the data acquisition unit has an outer radial side mounted to the translating sleeve and an inner radial side opposite the outer radial side and wherein the inner radial side defines a portion of the bypass flow path of the gas turbine engine.

19. The gas turbine engine of claim 17, wherein the data acquisition unit and the at least one sensor are configured to axially translate with the translating sleeve.

20. The gas turbine engine of claim 17, wherein the at least one sensor includes one or more of a temperature sensor or a pressure sensor.

\* \* \* \* \*